May 19, 1931. G. HUNT 1,806,292
AIR VENT FOR FUEL TANKS
Filed June 5, 1929
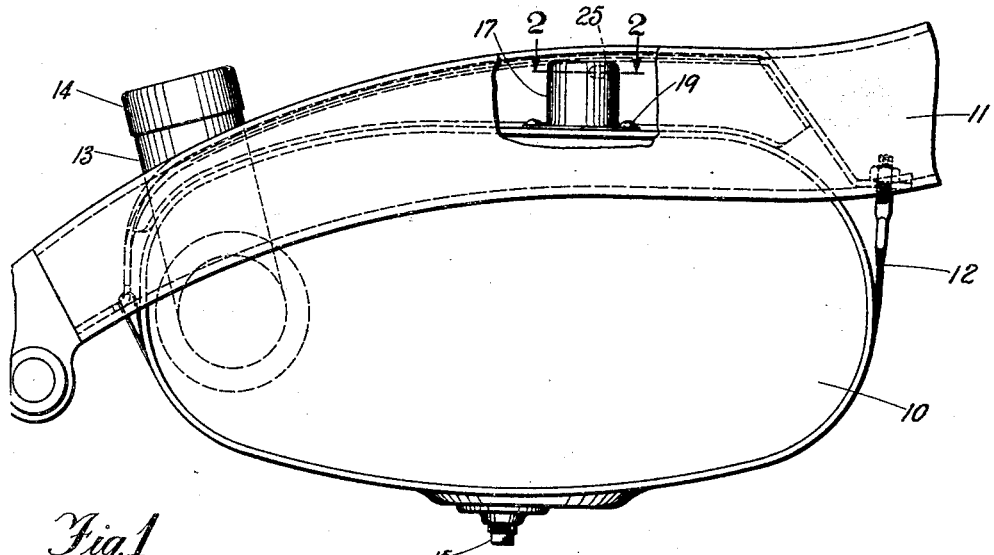
Fig. 1
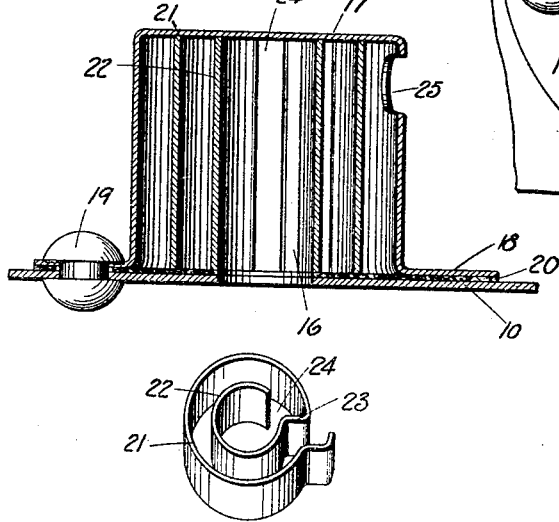
Fig. 3
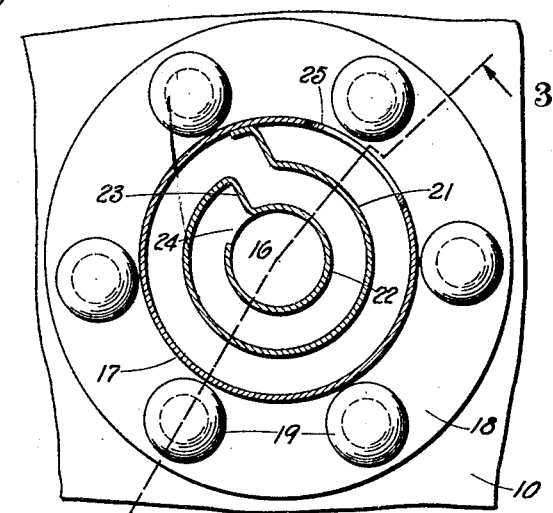
Fig. 2
Fig. 4
INVENTOR.
George Hunt
BY
ATTORNEY Patented May 19, 1931

1,806,292

UNITED STATES PATENT OFFICE

GEORGE HUNT, OF SOUTH BEND, INDIANA, ASSIGNOR TO THE STUDEBAKER CORPORATION, OF SOUTH BEND, INDIANA, A CORPORATION OF NEW JERSEY

AIR VENT FOR FUEL TANKS

Application filed June 5, 1929. Serial No. 368,648.

This invention relates to liquid fuel tanks and particularly to air vents therefor.

One of the objects of the invention is to provide a device which will not permit the liquid to splash or slop out of the tank when the tank is being filled but which will exclude water, moisture, dust, dirt and other foreign matter from the tank and which will admit air to the interior of the tank to relieve internal pressure therein.

Another object is to provide a vent or air valve for a liquid fuel tank which comprises a casing having an opening therein secured to the tank over an opening formed therein, and a baffle positioned within the casing having walls spaced from the sides thereof to permit air to pass into or out of the tank and to prevent the liquid from splashing out of the tank.

The above and other objects relating to certain features of construction and combination of parts to be hereinafter described with reference to the accompanying drawings, and then claimed, will be apparent from the detailed description to follow.

In the drawings which illustrates a suitable embodiment of the present invention, Figure 1 is a side elevation showing a liquid fuel tank supported by a vehicle frame, certain parts being broken away to better show my invention.

Figure 2 is a section taken on the line 2—2 of Figure 1.

Figure 3 is a section taken on the line 3—3 of Figure 2.

Figure 4 is a perspective of the baffle shown in Figures 2 and 3.

In the fuel tanks for automobiles and the like, considerable difficulty has been encountered in the filling of the tank because of the internal air pressure therein caused by the rapid filling of the tank. Numerous attempts have been made to provide air vents for the tank to overcome the above difficulty but so far as I am aware no one has heretofore provided an air vent which would permit the rapid filling of the tank and also provide a means so that the fuel would not splash or slop out of the tank when driving the car over rough roads or for other causes.

Having the above and other difficulties in mind, I have provided a new and useful design of air vent which will permit of the rapid filling of the tank and which will positively prevent the fuel from splashing out of the tank through the air vent.

Referring to the drawings in which like numerals refer to like parts throughout the several views, I have shown a fuel tank 10 supported by a vehicle frame 11 by means of the strap hangers 12 as is clearly shown in Figure 1. The fuel tank 10 is provided with a filler spout 13 having a closure 14 therewith to prevent water, moisture, dust and other foreign matter from getting into the tank 10. The tank 10 illustrated is also provided with a drain plug 15 to permit the draining of the tank if it is desirable or necessary to do so at any time. The tank 10 is also provided with an opening 16 in its upper face, the same being closed by a cup-shaped casing 17 having a flange 18 whereby the same is secured to the tank 10 by means of the rivets 19. A gasket 20 which may be formed of cork, paper or other suitable material, having an opening therein corresponding with the opening 16 in the tank 10, is preferably positioned between the tank 10 and the flange 18 so that the casing 17 will be secured to the tank 10 in a manner to prevent the possibility of any leakage around the joint. A baffle 21 extending between the gasket 20 and the bottom wall of the cup-shaped casing 17 is secured at one of its ends to the side wall of the casing 17, as is clearly shown in Figure 2. The baffle 21 is preferably formed to provide spaced vertical walls with its inner free end 22 substantially circular in cross section and of a size to surround the opening 16 in the tank 10, the extreme free end being spaced from the vertical wall 23 to provide an opening 24 extending the height of the casing 17. A vent or opening 25 is provided in the side wall of the casing 17 to permit the ingress and egress of air in and from the tank 10.

At any time when an internal pressure is built up in the tank, air is permitted to pass through the opening 16 through the slot 24 and circulated around the walls of the baffle 21 to escape through the opening 25 in the casing 17. Conversely, air is admitted to the tank 10 through the opening 25 then circulated around the walls of the baffle 21 through the slot 24 and through the opening 16 to admit air to the tank 10. While the air has free circulation in and from the tank 10 the fuel is prevented from splashing out of the air vent because the spaced walls of the baffle 21 prevents the fuel from ever reaching the outlet 25.

While I have shown and described one specific shape of baffle 21 in the casing 17, it is to be understood that the design and shape of the baffle can be modified in form and shape and still function to perform the service heretofore described.

Although the foregoing description is necessarily of a detailed character in order that the invention may be clearly set forth it is to be understood that the specific terminology is not intended to be restrictive or confining and that various re-arrangement of parts and modification of structural details may be resorted to without departing from the scope or spirit of the invention as herein defined.

What I claim is:

1. A vent for liquid fuel tanks and the like comprising, a cup-shaped casing having an opening in a wall thereof secured to said tank, and a baffle within said casing having walls extending the depth of said casing spaced from the side wall thereof permitting air but not liquid to escape through said opening.

2. A vent for liquid fuel tanks and the like comprising, a cup-shaped casing having an opening in a wall thereof secured to said tank, and a continuous baffle having circular walls spaced from the side wall of said casing extending from said tank to the bottom wall of said casing permitting air but not liquid to escape through said opening.

3. In combination with a liquid fuel tank having an opening therein, a cup-shaped casing having an opening in its side wall secured to said tank, and a baffle secured to the side wall of said casing on the inner face thereof, the free end of said baffle substantially surrounding the opening in said tank, said baffle being formed to provide a slot to permit air to pass through the opening in said tank, circulate around said baffle, and escape through the opening in said casing.

4. In combination with a liquid fuel tank having an opening therein, a cup-shaped casing having an opening in its side wall secured to said tank, and a baffle having its walls substantially parallel with the side wall of said casing and extending the depth thereof mounted therein, the free end of said baffle surrounding the opening in said tank and formed to provide a slot through which air is permitted to pass through the opening in said tank, circulate around said baffle, and escape through the opening in said casing.

5. In combination with a liquid fuel tank having an opening therein, a cup-shaped casing having an opening in its side wall and a flange at its open end secured to said tank, and a baffle having walls substantially parallel with the side wall of said casing and spaced therefrom mounted within said casing, the free end of said baffle being of substantially the same size and surrounding the opening in said tank, said baffle being formed to provide a slot through which air is permitted to pass from the opening in said tank, then circulate around said baffle, and escape through the opening in said casing.

6. In combination with a liquid fuel tank having an opening therein, a casing having an opening therein covering the opening in said tank, and a coiled baffle having one end engaging the side wall of said casing and the other end substantially surrounding the opening in said tank whereby air but not liquid is permitted to escape through the opening in said casing.

7. In combination with a liquid fuel tank having an opening therein, a casing having an opening therein covering the opening in said tank, and a coiled baffle seating on said tank, said baffle having one end engaging the side wall of said casing and the other end substantially surrounding the opening in said tank whereby air but not liquid is permitted to escape through the opening in said casing.

Signed by me at South Bend, Indiana, this 3rd day of June, 1929.

GEORGE HUNT.